United States Patent [19]

Roberts et al.

[11] Patent Number: 6,152,373
[45] Date of Patent: Nov. 28, 2000

[54] DETECTOR OF RADIO FREQUENCY SIGNALS FOR CONTACTLESS CHIP CARDS

[75] Inventors: Andrew James Roberts, Aix en Provence; Frederic Subbiotto, Fuveau; Nathalie Donat, Trets, all of France

[73] Assignee: STMicroelectronics S.A., Gentilly, France

[21] Appl. No.: 09/157,060

[22] Filed: Sep. 18, 1998

[30] Foreign Application Priority Data

Sep. 23, 1997 [FR] France .................................. 97 11787

[51] Int. Cl.<sup>7</sup> ..................................................... G06K 19/06
[52] U.S. Cl. .......................... 235/492; 235/451; 235/439
[58] Field of Search .................................. 235/492, 487, 235/493, 451, 439, 491

[56] References Cited

U.S. PATENT DOCUMENTS

| | | | |
|---|---|---|---|
| 3,816,708 | 6/1974 | Walton | 235/492 |
| 5,670,772 | 9/1997 | Goto | 235/493 |
| 5,801,372 | 9/1998 | Yamaguchi | 235/492 |
| 5,874,725 | 2/1999 | Yamaguchi | 235/492 |
| 5,942,926 | 8/1999 | Yamaguchi | 327/156 |

FOREIGN PATENT DOCUMENTS

| | | | |
|---|---|---|---|
| 0 676 727 A2 | 2/1995 | European Pat. Off. | G07B 15/00 |
| 2 662 876 | 5/1990 | France | H04B 1/16 |

*Primary Examiner*—Donald Hajec
*Assistant Examiner*—Larry D Taylor
*Attorney, Agent, or Firm*—Theodore E. Galanthay; Allen, Dyer, Doppelt, Milbrath & Gilchrist, P.A.

[57] ABSTRACT

A contactless chip card includes a circuit for detecting the presence of radio frequency signals. A detector comprises at least one circuit for detecting the presence of radio signals by making direct use of the corresponding signals received by an antenna winding. In addition, a phase-shift detector detects the relative phase differences between signals provided by the antenna winding.

19 Claims, 2 Drawing Sheets

DETECTOR OF RADIO FREQUENCY SIGNALS FOR CONTACTLESS CHIP CARDS

FIELD OF THE INVENTION

The invention relates to contactless chip cards in which the transmission of binary data between a user device and a contactless chip card is done via radio frequencies. In particular, the invention relates to a circuit within the contactless chip card for receiving and detecting radio frequency signals.

BACKGROUND OF THE INVENTION

In contactless chip cards, there are known ways of transmitting binary data from the user device to the chip cards by means of a signal transmitted at a carrier frequency f (i.e., 13.56 MHz) that is amplitude modulated by binary digits of a code to be transmitted. Contact chip cards work accurately only if they are able, at very high speed and with certainty, to recognize that the user device is communicating by means of radio frequency signals so the chip cards can place themselves in a mode of operation suited to recognizing signals of this type.

Recognizing radio frequency signals in the prior art is done by means of an electronic device of the type described in FIG. 1. This device comprises a circuit 10 for the detection of radio frequency signals which includes a resonant circuit comprising an antenna loop taking the form of a winding 20 and a capacitor $C_0$ which are parallel-connected. Circuit 10 provides a signal $V_{AC}$ whose waveform is shown in FIG. 2a.

The device further comprises a rectifier and filter circuit 12 which includes a four-diode bridge 22 coupled to a capacitor $C_1$ to provide a full-wave rectified signal $V_{DC}$ whose waveform is shown in FIG. 2b. Also included in the rectifier and filter circuit 12 is a resistor 14 and a comparator circuit 16 for comparing the potentials of $V_{DC}$ and $V_{DD}$ at the terminals of the resistor 14. The comparator circuit 16 provides a signal $V_{RF}$ at its output indicating the presence of binary amplitude-modulated radio frequency signals. This signal $V_{RF}$ informs the microcontroller 50 that the signal transmitted to the card is of the radio frequency type.

The invention is aimed at obtaining a detector of radio frequency signals for a chip card for determining the presence of radio frequency signals at high speed and with certainty. To this end, the detector, according to the invention, uses the signals at the carrier frequency.

SUMMARY OF THE INVENTION

The invention therefore relates to a detector for determining the presence of radio frequency signals for contactless chip cards. The detector comprises a reception antenna winding for receiving signals at a carrier frequency f transmitted by a user apparatus of the chip card. The detector comprises at least one detection circuit for detecting the presence of signals at the carrier frequency f. The input terminal of this detection circuit is connected to one end of the antenna winding.

BRIEF DESCRIPTION

Other features and advantages of the present invention shall appear from the following description of a particular exemplary embodiment, the description being made with reference to the appended drawings, of which:

In the different figures, the same references indicate identical elements.

DETAILED DESCRIPTION OF THE PREFERRED EMBODIMENTS

Figure 1:
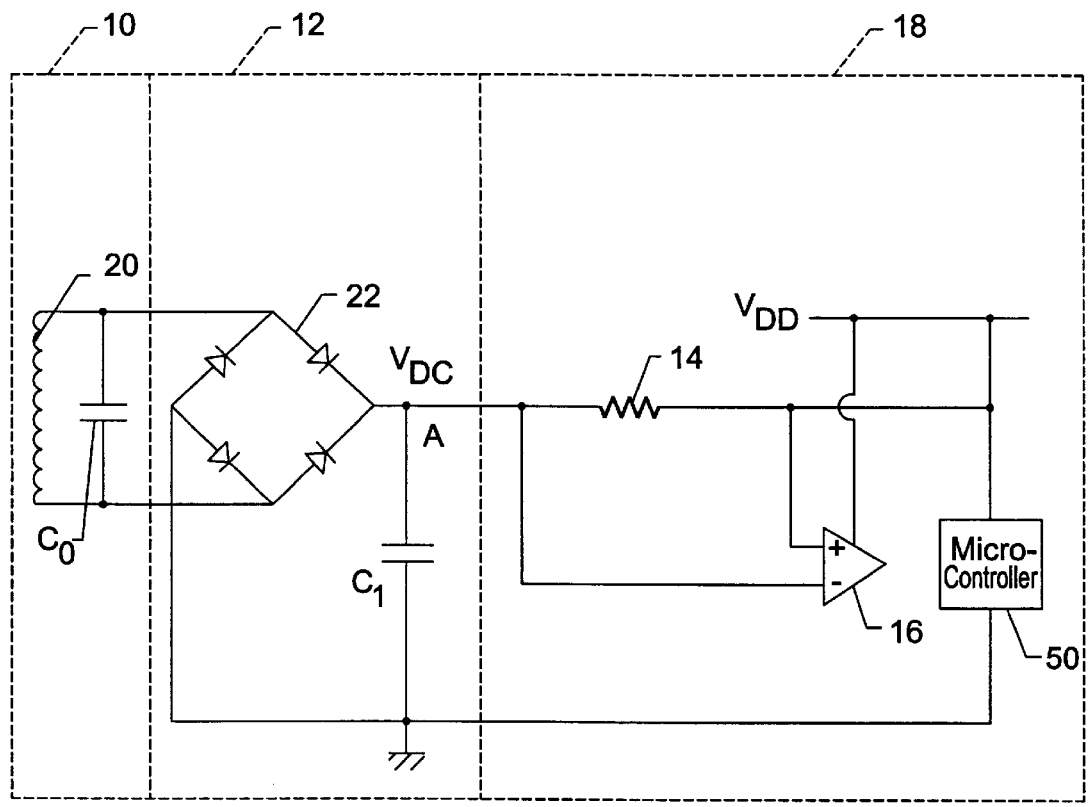
FIG. 1 is a functional diagram of a detector of radio frequency signals according to the prior art.
Figure 2A:
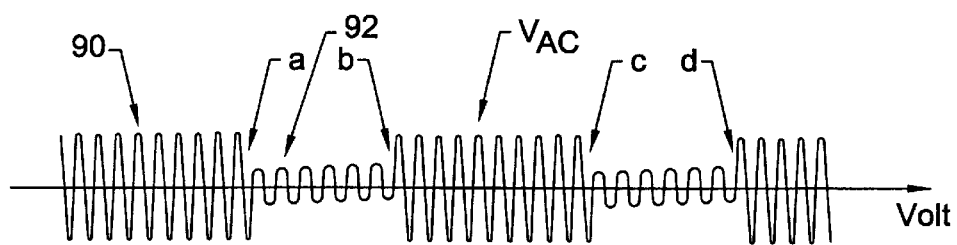
FIGS. 2a and 2b are drawings of signals at certain points of the diagram of FIG. 1.
Figure 2B:
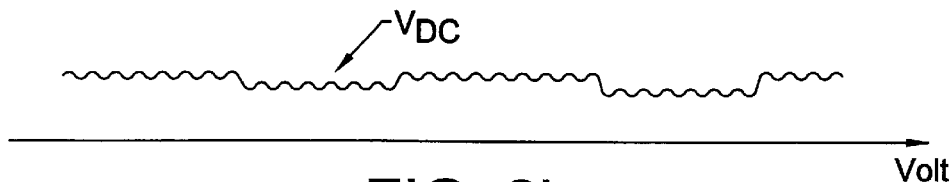
Figure 3:
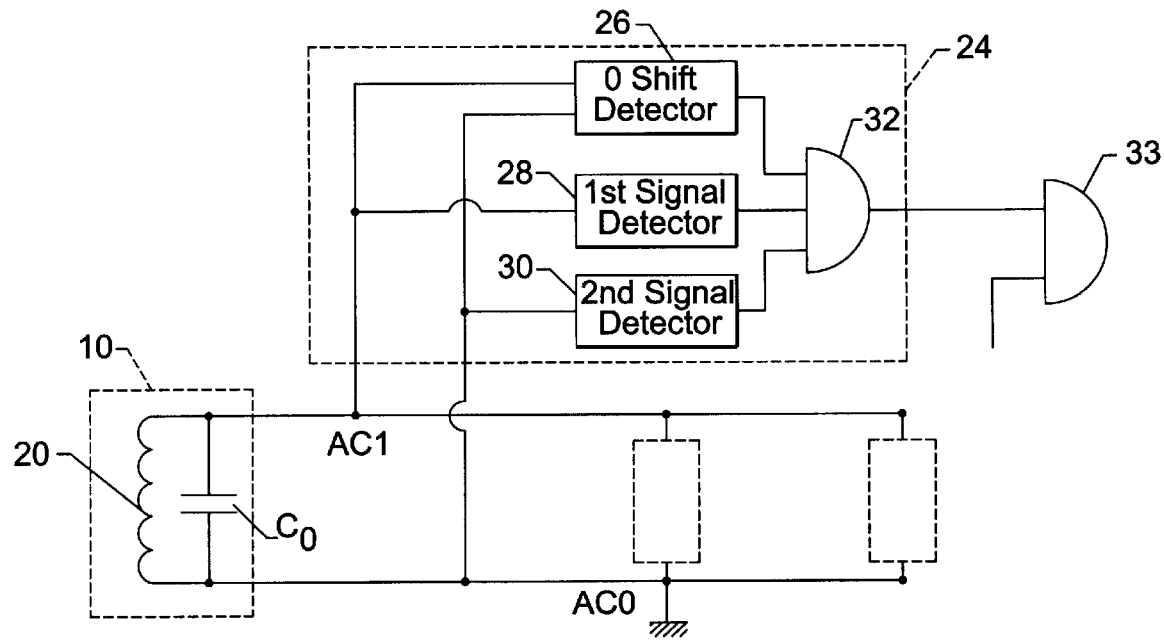
FIG. 3 is a functional diagram of a detector of radio frequency signals for chip cards according to the invention.

FIGS. 1 and 2 have been described in the introduction as a reminder of the prior art, and shall not be described again. A detector according to the invention is shown schematically by the elements of FIG. 3. The detector comprises a circuit 10 for the detection of signals transmitted by a user device of a chip card (not shown) which respectively provides the signals $V_{AC1}$ and $V_{AC0}$ to the ends AC1 and AC0 of the winding 20, and a circuit 24 for detecting the presence of these radio frequency signals.

It must be noted that the signals $V_{AC1}$ and $V_{AC0}$ may also be applied to other circuits of the chip card. In particular, they can be applied to a rectifier circuit 12 according to the drawing of FIG. 1 or to a circuit for the preparation of supply voltage for the chip card from the radio frequency energy received.

The detection circuit 24 comprises a phase-shift detector circuit 26 whose two input terminals are connected respectively to the ends AC1 and AC0 of the winding 20 and whose output terminal is connected to a first input terminal of an AND circuit 32. The detection circuit 24 also comprises a first detector 28 of radio frequency signals whose input terminal is connected to the end AC1 of the winding 20 and whose output terminal is connected to a second input terminal of the AND circuit 32. The detection circuit 24 further comprises a second radio frequency signal detector 30 whose input terminal is connected to the end AC0 of the winding 20 and whose output terminal is connected to a third input terminal of the AND circuit 32.

The three input terminals of the AND circuit 32 are connected as indicated above. The output terminal of the AND circuit 32 gives a signal indicating the presence or absence of a radio frequency signal. The output terminal of the AND circuit 32 may be connected directly to a microcontroller of the chip card to inform it whether or not there is a transmission of binary data by radio frequency. Alternatively, this output terminal may be connected to a first input terminal of an AND circuit 33 whose other input terminal is connected to the output terminal of the comparator 16 of FIG. 1.

Figure 4:
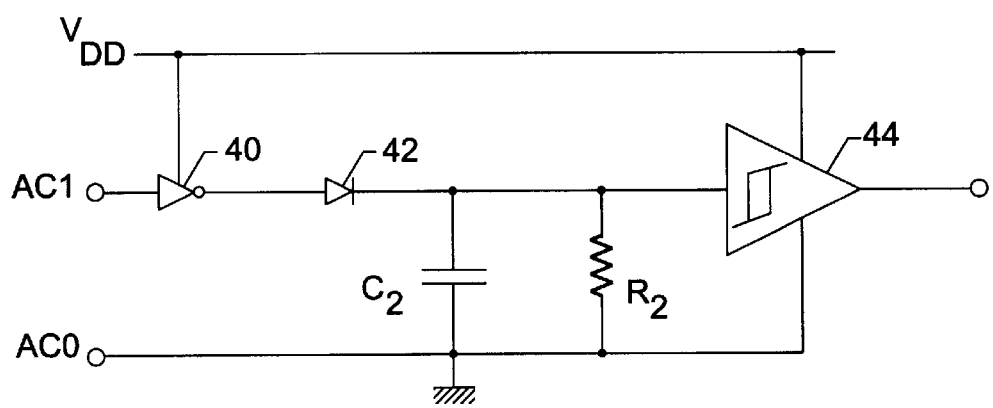
FIG. 4 is a drawing of one of the detector circuits 28 or 30 of FIG. 3.

Referring to FIG. 4, each detector circuit 28 or 30 comprises an inverter circuit 40 whose input terminal is connected to one end AC1 or AC0 of the winding 20 depending on the detector considered. Each detector circuit 28 or 30 further comprises a diode 42 whose anode is connected to the output terminal of the inverter circuit 40, a capacitor $C_2$ having one of its terminals connected to the cathode of the diode 42 and its other terminal connected to ground, a resistance $R_2$ parallel-connected to the capacitor $C_1$, and a flip-flop circuit 44. The flip-flop circuit 44 is known as a Schmitt trigger, whose input terminal is connected to the common point of the resistor $R_1$, the capacitor $C_1$, and the cathode of the diode 42. The inverter circuit 40 and the Schmitt trigger are supplied by the supply voltage $V_{DD}$.

In each detector circuit 28 or 30 according to the diagram of FIG. 4, the inverter circuit is for converting the signal at the carrier frequency f into a square-wave signal with an amplitude $V_{DD}$ at the same frequency. The diode 42 prevents the discharging of the capacitor $C_2$ when the output terminal of the inverter circuit 40 is at the ground potential. The capacitor $C_2$ and the resistor $R_2$ form an integration circuit which discharges through the resistor $R_2$.

The voltage at the input terminal of the Schmitt trigger 44 increases as the frequency f of the signal increases. Consequently, its switching threshold and the values of the components $C_2$ and $R_2$ are chosen so that the signals having a frequency greater than a predetermined value are detected and cause the switching.

Figure 5:
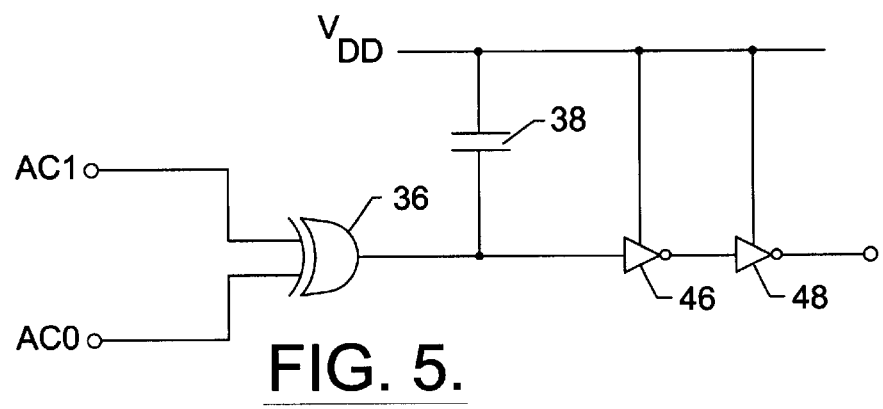
FIG. 5 is a drawing of the phase detector circuit 26 of FIG. 3.

Referring to FIG. 5, the phase-shift detector circuit 26 detects the relative phase differences between the signals $V_{AC1}$ and $V_{AC0}$. The phase-shift detector circuit 26 comprises an EXCLUSIVE-OR circuit 36 whose two input terminals AC1 and AC0 receive respectively the signals $V_{AC1}$ or $V_{AC0}$. The output terminal of the EXCLUSIVE-OR circuit 36 provides a signal when the two signals $V_{AC1}$ or $V_{AC0}$ are in phase opposition. A capacitor 38 is connected between the supply voltage $V_{DD}$ and the output terminal of the EXCLUSIVE-OR circuit 36 to filter the effects of the low-amplitude phase modulations between the signals $V_{AC1}$ and $V_{AC0}$. The filtered signal is applied to a reshaping circuit comprising, for example, two inverter circuits 46 and 48.

The invention has been described with reference to a detector comprising a phase-shift detector circuit 26 and two radio frequency detectors 28 and 30 whose output signals are combined in the logic circuit 32 and 36. However, a detector of this kind is capable of functioning when it has only certain elements: a single detector 28 or 30; or both the single detectors 28 and 30 for improving the certainty of detection as compared with only one detector; or a single detector 28 or 30 with the phase-opposition detector 26; or finally, the two detectors 28 and 30 and the phase-opposition detector 26 as described with reference to FIG. 3. Furthermore, the different assemblies may be combined with the prior art circuit of FIG. 1 as indicated above.

That which is claimed is:

1. A radio frequency signal detector for a contactless chip card, comprising:
   an antenna winding for receiving radio frequency signals at a carrier frequency transmitted by a user apparatus of the contactless chip card;
   a first detection circuit having an input terminal connected to a first end of the antenna winding for detecting the radio frequency signals at the carrier frequency, and an output terminal for indicating the presence of radio frequency signals;
   a phase-shift detector circuit having two input terminals connected to the first end and a second end of the antenna winding for providing a signal at an output terminal based upon phases of the signals applied to the input terminals; and
   a logic circuit having a plurality of input terminals, a first input terminal connected to the output terminal of the phase-shift detector circuit and a second input terminal connected to the output terminal of the first detection circuit.

2. A radio frequency signal detector according to claim 5, wherein the phases of the signals applied to the input terminals of the phase-shift detector circuit are in phase opposition.

3. A radio frequency signal detector according to claim 1, further comprising a second detection circuit having an input terminal connected to the second end of the antenna winding for detecting the radio frequency signals at the carrier frequency, and an output terminal for indicating the presence of radio frequency signals, and connected to a third input of said logic circuit.

4. A radio frequency signal detector according to claim 1, wherein the first detection circuit comprises:
   an inverter circuit having an input terminal connected to the first end of the antenna winding;
   a diode having an anode connected to an output terminal of the inverter circuit;
   an integration circuit comprising a capacitor and a resistor parallel-connected such that a common connection point is a cathode of the diode; and
   a flip-flop circuit having an input terminal connected to the cathode of the diode, the flip-flop circuit changing states when a charging voltage applied to the capacitor is greater than a predetermined threshold.

5. A radio frequency signal detector according to claim 1, wherein the phase-shift detector circuit comprises:
   an EXCLUSIVE-OR circuit having two input terminals connected across the first and second ends of the antenna winding, and an output terminal; and
   a capacitor connected to the output terminal of the EXCLUSIVE-OR circuit for filtering low amplitude phase modulations between the signals applied to the two input terminals.

6. A radio frequency signal detector according to claim 1, wherein the logic circuit is an AND gate.

7. A radio frequency signal detector for a contactless chip card, comprising:
   an antenna winding for receiving radio frequency signals at a carrier frequency transmitted by a user apparatus of the contactless chip card;
   a first detection circuit having an input terminal connected to a first end of the antenna winding for detecting the radio frequency signals at the carrier frequency, and an output terminal for indicating the presence of radio frequency signals;
   a second detection circuit having an input terminal connected to a second end of the antenna winding for detecting the radio frequency signals at the carrier frequency, and an output terminal for indicating the presence of radio frequency signals;
   a logic circuit having a plurality of input terminals, a first input terminal connected to the output terminal of the first detection circuit and a second input terminal connected to the output terminal of the second detection circuit so that the output of the logic circuit indicates the presence of radio frequency signals; and
   a phase-shift detector circuit having two input terminals connected across the first and second ends of the antenna winding for providing a signal at an output terminal based upon phases of the signals applied to the input terminals, said phase-shift detector circuit having an output connected to a third input of the logic circuit.

8. A radio frequency signal detector according to claim 7, wherein the phases of the signals applied to the input terminals of the phase-shift detector circuit are in phase opposition.

9. A radio frequency signal detector according to claim 7, wherein the first and second detection circuits each comprise:
   an inverter circuit having an input terminal connected to one end of the antenna winding;

a diode having an anode connected to an output terminal of the inverter circuit;

an integration circuit comprising a capacitor and a resistor parallel-connected such that a common connection point is a cathode of the diode; and a flip-flop circuit having an input terminal connected to the cathode of the diode, the flip-flop circuit changing states when a charging voltage applied to the capacitor is greater than a predetermined threshold.

10. A radio frequency signal detector according to claim 7, wherein the phase-shift detector circuit comprises:

an EXCLUSIVE-OR circuit having two input terminals connected across the first and second ends of the antenna winding, and an output terminal; and a capacitor connected to the output terminal of the EXCLUSIVE-OR circuit for filtering low amplitude phase modulations between the signals applied to the two input terminals.

11. A radio frequency signal detector according to claim 7, wherein the logic circuit is an AND gate.

12. A contactless chip card, comprising:

a radio frequency signal detector comprising:

an antenna winding for receiving radio frequency signals at a carrier frequency;

a first detection circuit having an input terminal connected to a first end of the antenna winding for detecting the radio frequency signals at the carrier frequency, and an output terminal for indicating the presence of radio frequency signals;

a phase-shift detector circuit having two input terminals connected to the first end and a second end of the antenna winding for providing a signal at an output terminal based upon phases of the signals applied to the input terminals; and a logic circuit having a plurality of input terminals, a first input terminal connected to the output terminal of the phase-shift detector circuit and a second input terminal connected to the output terminal of the first detection circuit.

13. A contactless chip card according to claim 12, wherein the phases of the signals applied to the input terminals of the phase-shift detector circuit are in phase opposition.

14. A contactless chip card according to claim 12, wherein the radio frequency signal detector further comprises a second detection circuit having an input terminal connected to the second end of the antenna winding for detecting the radio frequency signals at the carrier frequency, and an output terminal for indicating the presence of radio frequency signals connected to a third input terminal of said logic circuit.

15. A contactless chip card according to claim 12, wherein the first detection circuit comprises:

an inverter circuit having an input terminal connected to the first end of the antenna winding;

a diode having an anode connected to an output terminal of the inverter circuit;

an integration circuit comprising a capacitor and a resistor parallel-connected such that a common connection point is a cathode of the diode; and a flip-flop circuit having an input terminal connected to the cathode of the diode, the flip-flop circuit changing states when a charging voltage applied to the capacitor is greater than a predetermined threshold.

16. A contactless chip card according to claim 12, wherein the phase-shift detector circuit comprises:

an EXCLUSIVE-OR circuit having two input terminals connected across the first and second ends of the antenna winding, and an output terminal; and a capacitor connected to the output terminal of the EXCLUSIVE-OR circuit for filtering low amplitude phase modulations between the signals applied to the two input terminals.

17. A method of detecting radio frequency signals for a contactless chip card, comprising the steps of:

receiving radio frequency signals at a carrier frequency transmitted by a user apparatus of the contactless chip card via an antenna winding;

detecting the radio frequency signals at the carrier frequency using at least one detection circuit and outputting a signal for indicating the presence of radio frequency signals;

applying signals received by the antenna winding to a phase-shift detector for outputting a signal based upon phases of the signals; and applying the output signals from the at least one detection circuit and the phase-shift detector to a logic circuit so that an output signal from the logic circuit indicates the presence of radio frequency signals.

18. A method according to claim 17, further comprising the step of detecting the radio frequency signals at the carrier frequency using a second detection circuit and outputting a signal for indicating the presence of radio frequency signals; and wherein the output signal is applied to the logic circuit.

19. A method according to claim 17, wherein the phases of the signals applied to the phase-shift detector circuit are in phase opposition.

* * * * *